United States Patent
Lee (10) Patent No.: US 11,173,527 B2
(45) Date of Patent: Nov. 16, 2021

(54) METHOD AND APPARATUS FOR TREATMENT OF CONTAMINATED SOIL WITH DIOXINE, AGRICULTURAL PESTICIDES, OIL, ORGANIC CHEMICALS AND VOLATILE HEAVY METALS

(71) Applicant: BEAUTIFUL ENVIRONMENTAL CONSTRUCTION CO., LTD., Gyeonggi-do (KR)

(72) Inventor: Jong-yeol Lee, Seoul (KR)

(73) Assignee: BEAUTIFUL ENVIRONMENTAL CONSTRUCTION CO., LTD., Gyeonggi-Do (KR)

( * ) Notice: Subject to any disclaimer, the term of this patent is extended or adjusted under 35 U.S.C. 154(b) by 71 days.

(21) Appl. No.: 16/608,502

(22) PCT Filed: Apr. 17, 2018

(86) PCT No.: PCT/KR2018/004415
§ 371 (c)(1),
(2) Date: Jan. 29, 2020

(87) PCT Pub. No.: WO2018/199529
PCT Pub. Date: Nov. 1, 2018

(65) Prior Publication Data
US 2020/0206792 A1    Jul. 2, 2020

(30) Foreign Application Priority Data
Apr. 28, 2017 (KR) .................. 10-2017-0055245

(51) Int. Cl.
*B09C 1/02* (2006.01)
*B09C 1/06* (2006.01)
*B09C 1/08* (2006.01)

(52) U.S. Cl.
CPC ............. *B09C 1/02* (2013.01); *B09C 1/065* (2013.01); *B09C 1/08* (2013.01)

(58) Field of Classification Search
CPC combination set(s) only.
See application file for complete search history.

(56) References Cited

U.S. PATENT DOCUMENTS

| 5,011,329 A   | * | 4/1991  | Nelson   | B09C 1/06 405/128.65  |
|---|---|---|---|---|
| 2007/0116524 A1 | * | 5/2007  | Shiau    | B09C 1/02 405/128.15  |
| 2016/0375471 A1 | * | 12/2016 | Kautzman | B09C 1/08 405/128.75  |

FOREIGN PATENT DOCUMENTS

JP    2009226379 A    10/2009
KR 1020040082635 A     9/2004
(Continued)

OTHER PUBLICATIONS

International Search Report for Application No. PCT/KR2018/004415, dated Feb. 21, 2019, 4 pages.

*Primary Examiner* — Kyle Armstrong
(74) *Attorney, Agent, or Firm* — Nixon Peabody LLP; Thomas P. Pavelko (57) ABSTRACT

The present invention relates to a method for treating contaminated soil. A method for treating contaminated soil according to the present invention comprises: a flushing step of inserting a spraying rod including a nozzle into soil to spray a flushing liquid or an oxidizing liquid thereto; a first collection step of collecting floating material from the soil after the flushing step; a first phase separation step of separating the floating material collected in the first collection step into a liquid phase material and a solid phase material; a heating step of inserting a heating member into the solid fraction separated in the phase separation step to (Continued)

heat the solid fraction; a second collection step of collecting steam generated by the heating step; and a pyrolysis step of separating a gas phase material from the floating material from the floating material separated in the second collection step and performing heat treatment.

7 Claims, 1 Drawing Sheet

(56) References Cited

FOREIGN PATENT DOCUMENTS

| | | |
|---|---|---|
| KR | 100559166 B1 | 3/2006 |
| KR | 100872379 B1 | 12/2008 |
| KR | 1020110041262 A | 4/2011 |
| KR | 101429471 B1 | 8/2014 |
| KR | 101801216 B1 | 11/2017 |

* cited by examiner

METHOD AND APPARATUS FOR TREATMENT OF CONTAMINATED SOIL WITH DIOXINE, AGRICULTURAL PESTICIDES, OIL, ORGANIC CHEMICALS AND VOLATILE HEAVY METALS

TECHNICAL FIELD

The present invention relates to a method and an apparatus for treating contaminated soil by inserting spraying rods into soil to flush or oxidize contaminants in the soil using a flushing liquid or an oxidizing liquid, followed by treatment of a floating material separated from the soil.

BACKGROUND ART

In general, soil contamination may be caused by a variety of causes such as spilled oils, pesticides sprayed onto farm lands, and the like, or chemicals flowing in from industries, and the like. Materials that contaminate the soil in this manner require intensive treatment because they may have a risk of being introduced into the human body through the intake of agricultural products and the like, which have grown in the contaminated soil, and may lead to secondary contamination such as water contamination, and the like.

However, such soil contamination is a problem in that it is difficult to treat a large amount and area of the soil at a time due to its characteristics. Methods for treating such soil may be mainly divided into an ex-situ method and an in-situ method. The ex-situ method is a method that includes separating soil from a contaminated site using a method such as digging, and the like, treating the soil, and returning the soil to the original position, and the in-situ method is a method that includes directly treating soil on the site without movement of the soil.

However, the ex-situ method has a drawback in that it is very difficult to treat a large area of the land because it takes lots of time, money and manpower to move a large amount of soil and it also takes lots of time and money to return the soil to the original position after the treatment.

To solve the above problems, Registered Korean Patent No. 10-0559166 discloses a method of biological restoration of oil-contaminated soil with oil using peat moss as one of the ex-situ methods. However, the use of this method has a problem in that it takes too much time to treat the contaminated soil.

DISCLOSURE

Technical Problem

One aspect of the present invention is to provide a method for treating contaminated soil without soil loss.

Another aspect of the present invention is to provide a method for treating contaminated soil without requiring separate post-treatment processes such as waste transfer, and the like.

Still another aspect of the present invention is to provide a method for treating contaminated soil which is capable of treating a large area of soil in a short period of time.

Yet another aspect of the present invention is to provide a method for treating contaminated soil which involves remediating contaminated soil in a region where it is impossible to excavate soil, an excessively narrow space, or a region where remediation is difficult because a very deep bed of soil is contaminated.

Technical Solution

A method for treating contaminated soil according to the present invention includes:

a flushing step of inserting spraying rods including a nozzle into soil to spray a flushing liquid or an oxidizing liquid thereto;

a first collection step of collecting a floating material from the soil surface after the flushing step;

a first phase separation step of separating the floating material collected in the first collection step into a liquid phase and a solid phase;

a heating step of inserting a heating member into the solid-phase fraction separated in the phase separation step to heat the solid-phase fraction;

a second collection step of collecting steam generated in the heating step; and a pyrolysis step of separating a gas phase from the floating material separated in the second collection step and subjecting the gas-phase fraction to heat treatment.

In the method for treating contaminated soil according to one embodiment of the present invention, a spraying pressure of the flushing liquid or the oxidizing liquid sprayed in the cleaning step may be in a range of 50 to 800 $kgf/cm^2$.

In the method for treating contaminated soil according to one embodiment of the present invention, a spraying capacity of the flushing liquid or the oxidizing liquid sprayed in the cleaning step may be in a range of 1 to 25 $m^3/min$.

In the method for treating contaminated soil according to one embodiment of the present invention, a temperature of the heating member in the heating step may be in a range of 400 to 800° C.

In the method for treating contaminated soil according to one embodiment of the present invention, a heat treatment temperature in the heat treatment step may be in a range of 800 to 1,200° C.

Also, the present invention provides an apparatus for treating contaminated soil. The apparatus for treating contaminated soil according to the present invention includes:

A flushing portion configured to inject a flushing liquid or an oxidizing liquid into soil to collect and treat or oxidize a floating material; and a reclamation portion configured to decompose contaminants in the solid-phase mixture separated in the flushing portion.

In the apparatus for treating contaminated soil according to one embodiment of the present invention, the flushing portion may include:

spraying rods inserted into the soil to be spaced apart from each other and including a spray nozzle configured to spray the flushing liquid or the oxidizing liquid; and a collection portion disposed on the soil into which the spraying rods are inserted and configured to collect the floating material.

In the apparatus for treating contaminated soil according to one embodiment of the present invention, the flushing portion may further include a high-pressure pump communicating with the spray nozzle and configured to spray the flushing liquid or the oxidizing liquid at a high pressure.

In the apparatus for treating contaminated soil according to one embodiment of the present invention, the reclamation portion may include: a heating rod inserted into the solid-phase mixture separated in the collection portion to be spaced apart from each other;

a collection tube configured to collect steam generated by heat from the heating rod; and air injection tubes inserted into the solid-phase mixture to be spaced apart from each other and configured to inject air into the inside of the solid-phase mixture.

In the apparatus for treating contaminated soil according to one embodiment of the present invention, the reclamation portion may further include a compressor, and the air injection tubes may communicate with the compressor so that the injected air is allowed to deliver heat to the solid-phase mixture.

In the apparatus for treating contaminated soil according to one embodiment of the present invention, the reclamation portion may further include a cover layer configured to cover the solid-phase mixture, and the cover layer may prevent the leakage of the steam evaporated from the solid-phase mixture.

The apparatus for treating contaminated soil according to one embodiment of the present invention may further include a gas-phase separator communicating with the collection tube and collection pores and configured to separate a gas phase and a solid/liquid mixture.

In the apparatus for treating contaminated soil according to one embodiment of the present invention, the reclamation portion may further include a carbonization furnace, and the carbonization furnace may communicate with the gas-phase separator to carbonize the gas phase flowing in from the gas-phase separator.

Advantageous Effects

A method for treating contaminated soil according to the present invention has an advantage in that the loss of soil can be prevented by collecting a floating material after flushing or oxidation of the soil, removing only contaminants in a step of separating only the contaminants from the collected floating material, and reclaiming the soil from which the contaminants were removed.

The method for treating contaminated soil according to the present invention has an advantage in that the cost for disposal of waste capable of being generated after treatment of the contaminated soil may be reduced by thermally decomposing the contaminants.

The method for treating contaminated soil according to the present invention includes inserting spraying rods deep into the soil to spray a flushing liquid or an oxidizing liquid thereto, and thus has an advantage in that it is possible to treat a region where it is difficult to excavate soil, a region having an excessively narrow space, or a region where a very deep bed of soil is contaminated.

BEST MODE

Figure 1:
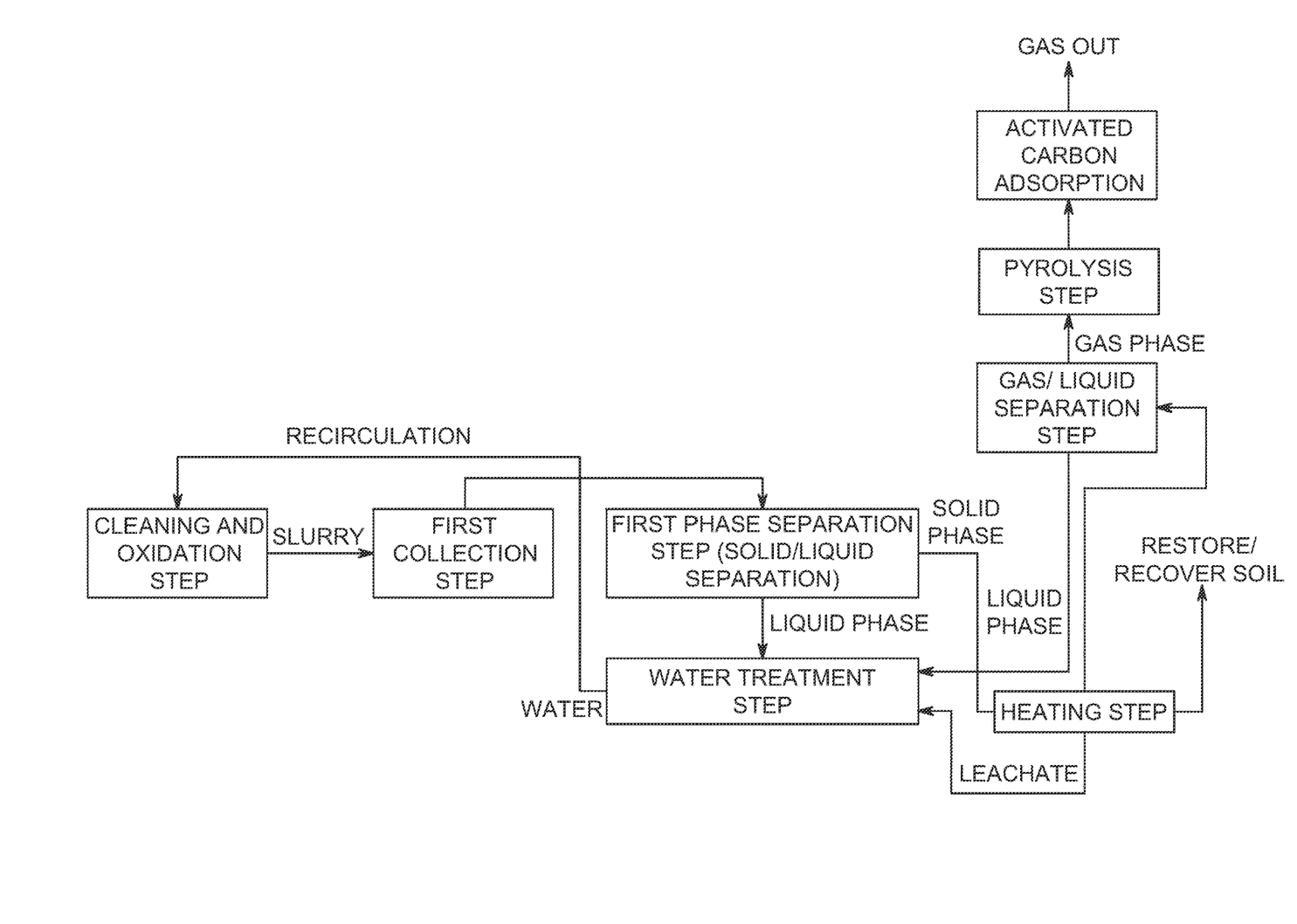
FIG. 1 is a diagram schematically showing a method for treating contaminated soil according to one embodiment of the present invention.

Hereinafter, a method and an apparatus for treating contaminated soil according to the present invention will be described in detail with reference to the accompanying drawing. The drawing presented hereinbelow is shown as one example to sufficiently provide the scope of the present invention to those skilled in the art. Therefore, it should be understood that the present invention may be embodied in various forms, but is not intended to be limiting in the drawing presented hereinbelow. In this case, the drawing presented hereinbelow may be shown in an exaggerated manner to make the scope of the present invention more clearly apparent. In this case, unless otherwise defined, the technical and scientific terms used herein have the same meaning as commonly understood by one of ordinary skill in the art to which the present invention pertains. In the following description and the accompanying drawing, a description of known functions and configurations, which may unnecessarily obscure the subject matter of the present invention, will be omitted.

The present invention relates to a method for treating contaminated soil, which includes:

a flushing step of inserting spraying rods including a nozzle into soil to spray a flushing liquid or an oxidizing liquid thereto;

a first collection step of collecting a floating material from the soil after the flushing step;

a first phase separation step of separating the floating material collected in the first collection step into a gas phase, a liquid phase, and a solid phase;

a heating step of inserting a heating member into the solid-phase fraction separated in the phase separation step to heat the soil;

a second collection step of collecting steam generated in the heating step; and a pyrolysis step of separating a gas phase from the second floating material separated in the second collection step and subjecting the gas-phase fraction to heat treatment.

When contaminated soil is treated by the treatment method according to the present invention, the method has an advantage in that it is unnecessary to move soil in a separate manner because the contaminated soil may be treated in situ, and treating of slurry generated accordingly may be completed. Also, the method has an advantage in that problems, such as soil loss, which may be caused during remediating of soil, and the like, may be solved by removing contaminants from slurry, and the like generated by flushing or oxidation to separate only the soil. Further, the method for treating contaminated soil according to the present invention has an advantage in that a region where it is difficult to excavate soil, a region having an excessively narrow space, or a region where a very deep bed of soil is contaminated may be treated by inserting spraying rods deep into soil to spray a flushing liquid or an oxidizing liquid thereto.

The method for treating contaminated soil according to the present invention includes inserting spraying rods including a nozzle into soil to spray a flushing liquid or an oxidizing liquid thereto. The method has an advantage in that an amount of the remaining contaminants may be minimized because the contaminated soil is flushed or oxidized by means of such a flushing step with higher efficiency.

Specifically, the spraying rods are not limited as long as the spraying rods are in the form of a stick capable of spraying the flushing liquid or the oxidizing liquid, and a material for the spraying rods is also not limited as long as the material is a material in which reactions (such as corrosion, and the like) by the flushing liquid or the oxidizing liquid may not occur. In addition, a length of the spraying rods may vary depending on the depth of soil to be treated. For example, according to one specific and non-limiting example, the length of the spraying rods may be in a range of 0.5 to 12 m, and more specifically in a range of 2 to 10 m. Further, a spraying pressure of the flushing liquid or the oxidizing liquid sprayed through the spraying rods may vary depending on the interval between spraying rods, the density of soil, and the like. For example, the spraying pressure of the flushing liquid or the oxidizing liquid may be specifically in a range of 50 to 800 kgf/cm², and more specifically in a range of 100 to 500 kgf/cm². Also, a spraying capacity of the flushing liquid or the oxidizing liquid sprayed through the spraying rods may be in a range of 1 to 25 m³/min, but the present invention is not limited thereto.

Additionally, the flushing step according to one embodiment of the present invention may be performed using one or two or more spraying rods, and the number of spraying rods may vary depending on the area of a land to be treated, and the like. Specifically, the flushing step may be performed using 1 to 10 spraying rods. Also, the interval between such spraying rods may vary depending on the spraying pressure and spraying capacity of the flushing liquid or the oxidizing liquid, and the like. Specifically, the spraying rods may be buried at an interval of 0.6 to 1 m with respect to a spraying pressure of 100 kgf/cm². When the spraying rods are buried in an interval range, a decrease in flushing or oxidation efficiency caused by the use of too many spraying rods may be prevented while uniformly flushing or oxidizing a desired area of land.

More specifically, the spraying of the flushing liquid or the oxidizing liquid in the flushing step may be performed while rotating the spraying rods. In this case, such rotation may be performed at a rate of 10 to 200 rounds per minute, but the present invention is not limited thereto.

In this case, the flushing liquid or the oxidizing liquid sprayed on the soil in the flushing step is not limited as long as the flushing liquid or the oxidizing liquid is a liquid material commonly used to flush or oxidize the soil. Specifically, it is desirable that the flushing liquid or the oxidizing liquid may be water, an oxidizing agent, an aqueous zero-valent nanoiron solution, a reducing microbial culture fluid, or a surfactant, and may be changed depending on the type of contaminants present in the soil. Specifically, the oxidizing agent may include one or two more selected from hydrochloric acid, sulfuric acid, nitric acid, phosphoric acid, iron (III) chloride, electrolyzed water, hypochlorite, sodium persulfate, hydrogen peroxide, and the like, and the surfactant may include one or two more selected from sodium dodecyl sulfate, sodium lauryl sulfate, sodium dodecylbenzenesulfonate, and the like, but the present invention is not limited thereto. Also, the oxidizing agent and the surfactant may be an aqueous liquid phase. In this case, a concentration of the oxidizing agent or the surfactant may vary depending on the type of respective materials and a degree of contamination of soil. As one specific and non-limiting example, the concentration of the oxidizing agent or the surfactant may be in a range of 0.5 to 20% by weight, but the present invention is not limited thereto.

As described above, the flushing liquid or the oxidizing liquid may also include zero-valent nanoiron, and chlorine atoms in dioxins included in the soil may be substituted with hydrogen atoms by such zero-valent nanoiron. In this case, the flushing liquid or the oxidizing liquid has an advantage in that such substitution may significantly reduce toxicity of the dioxins. In this case, it is desirable that a particle size of the zero-valent nanoiron may be in a range of 10 to 200 nm, and specifically in a range of 20 to 180 nm, and the zero-valent nanoiron may be subjected to treatment such as surface treatment, and the like in order to secure stability in an aqueous solution. Also, a concentration of the zero-valent nanoiron may be in a range of 0.1 to 20% by weight, and specifically in a range of 1 to 5% by weight. However, it is desirable that the concentration of the zero-valent nanoiron may vary depending on the concentration of the contaminants (e. g., dioxins, and the like) included in the soil.

Further, a temperature of the flushing liquid or the oxidizing liquid may be in a range of 10 to 95° C., and preferably in a range of 50 to 80° C. When the flushing liquid or the oxidizing liquid having this relatively higher temperature of 50 to 80° C. is used, the flushing liquid or the oxidizing liquid has an advantage in that the flushing and oxidation in the soil may be further actively performed while spraying the flushing liquid or the oxidizing liquid, and the contaminants may be more easily reacted with the oxidizing agent, and the like included in the flushing liquid or the oxidizing liquid.

In such a flushing step, a flushing time may vary depending on the concentration of the contaminants included in the soil, and the like, but the flushing step may be specifically performed for 10 minutes to 2 hours, and more specifically for 20 minutes to 1 hour. In addition, when the concentration of the contaminants remaining in the soil is not less than a desired concentration value, the flushing step may be repeatedly performed at least twice to up to 10 times.

Further, in the method for treating contaminated soil according to one embodiment of the present invention, the flushing step may include: a first flushing liquid or oxidizing liquid spraying step of spraying an oxidizing agent, a surfactant, or an aqueous zero-valent nanoiron solution;

a second flushing liquid or oxidizing liquid spraying step of spraying water; and a hot air spraying step of spraying hot air.

When the flushing step is divided into steps, which are then performed, the flushing step has an advantage in that the contaminant remaining in the soil may be more efficiently removed, and the spraying step of spraying hot air may be used to treat a larger area of the soil through the same number of spraying rods. Also, the flushing step has an advantage in that a larger area of the soil may be treated through one spraying rod when compared to the 3-step spraying of the hot air, and it is possible to treat the soil at a high speed.

Specifically, in the first flushing liquid or oxidizing liquid spraying step or the second flushing liquid or oxidizing liquid spraying step, the flushing liquid or the oxidizing liquid may be specifically sprayed at a spraying pressure of 50 to 800 kgf/cm², and more specifically a spraying pressure of 100 to 400 kgf/cm². Also, a spraying capacity of the flushing liquid or the oxidizing liquid sprayed in the first spraying step or the second spraying step may be in a range of 1 to 25 m³/min. Specifically, the spraying pressures and the spraying capacities in the first flushing liquid or oxidizing liquid spraying step and the second flushing liquid or oxidizing liquid spraying step may satisfy the following Relations 1 and 2 while satisfying the aforementioned numerical ranges.

$$0.5 \leq \frac{P_1}{P_2} \leq 0.85 \qquad \text{[Relation 1]}$$

wherein, $P_1$ represents a spraying pressure of an oxidizing agent or a surfactant sprayed in the first flushing liquid or oxidizing liquid spraying step, and $P_2$ represents a spraying pressure of water sprayed in the second flushing liquid or oxidizing liquid spraying step.

$$0.6 \leq \frac{C_1}{C_2} \leq 0.95 \qquad \text{[Relation 2]}$$

wherein, $C_1$ represents a spraying capacity per minute of an oxidizing agent or a surfactant sprayed in the first flushing liquid or oxidizing liquid spraying step, and $C_2$ represents a spraying capacity per minute of water sprayed in the second flushing liquid or oxidizing liquid spraying step.

When the spraying pressures and the spraying capacities per minute sprayed in the first flushing liquid or oxidizing liquid spraying step and the second flushing liquid or oxidizing liquid spraying step satisfy Relations 1 and 2, the first and second spraying steps have an advantage in that a residual amount of the oxidizing agent or the surfactant remaining in the soil may be minimized while more efficiently removing the contaminants as described above.

Also, a spraying pressure of the hot air sprayed in the hot air spraying step may be in a range of 3 to 200 kgf/cm², and specifically in a range of 5 to 150 kgf/cm², but the present invention is not limited thereto. In addition, the temperature of the hot air may be in a range of 50 to 200° C., and specifically in a range of 80 to 150° C., but the present invention is not limited thereto.

The flushing step according to another embodiment of the present invention may include:

a substitution step of spraying an aqueous zero-valent nanoiron solution; and an oxidation step of spraying an oxidizing agent after the substitution step.

The method for treating contaminated soil according to one embodiment of the present invention has an advantage in that, when the contaminated soil is treated by a method including the substitution step and the oxidation step, the method is particularly useful in treating the soil contaminated with a large amount of dioxins, and a decrease in efficiency of the zero-valent nanoiron vulnerable to oxidation may be prevented by this method. Also, a substitution reaction in which chlorine atoms of dioxins included in the soil are substituted with hydrogen atoms may be performed by the zero-valent nanoiron, and the dioxins may be converted into organic compounds having relatively low toxicity by means of such a substitution reaction. The organic compound generated by the zero-valent nanoiron in this way may be oxidized by the oxidizing agent sprayed in the oxidation step, and collected in the collection step so that the organic compound can be separated from the soil. That is, when a method for remediating a contaminated region according to one embodiment of the present invention includes the substitution step and the oxidation step, the method has an advantage in that by-products generated during the removal of dioxins may be removed at once while treating the dioxins included in the soil with significantly high efficiency.

In the method for treating contaminated soil according to another embodiment of the present invention, the flushing step may include a reaction solution spraying step of spraying an aqueous solution including one or two or more selected from water, an oxidizing agent, and zero-valent nanoiron; and a reaction promotion step of injecting hot air and glycol ether. The method for treating contaminated soil according to one embodiment of the present invention may include the aforementioned reaction promotion step, and thus has an advantage in that a reaction between the contaminants and a reaction solution sprayed in the reaction solution spraying step may be promoted. Specifically, a reaction rate of the contaminants included in the soil with the oxidizing agent or the zero-valent nanoiron may be significantly increased due to the synergy effect of the glycol ether and the hot air sprayed in the reaction promotion step. In this case, the glycol ether may be an ether prepared using glycols uses in a conventional aspect. As one specific and non-limiting example, the glycol ether may include one or two or more selected from ethylene glycol monomethyl ether, diethylene glycol monomethyl ether, triethylene glycol monomethyl ether, polyethylene glycol monomethyl ether, ethylene glycol monoisopropyl ether, diethylene glycol monoisopropyl ether, ethylene glycol monobutyl ether, diethylene glycol monobutyl ether, triethylene glycol monobutyl ether, ethylene glycol monoisobutyl ether, ethylene glycol monohexyl ether, ethylene glycol monoallyl ether, and ethylene glycol mono-2-ethylhexyl ether, but the present invention is not limited thereto.

In this case, a spraying pressure of the glycol ether may be in a range of 50 to 800 kgf/cm², and more specifically in a range of 100 to 500 kgf/cm², and a spraying capacity of the glycol ether sprayed in the first spraying step or the second spraying step may also be in a range of 1 to 15 m³/min, but the present invention is not limited thereto. Also, a spraying pressure of the hot air may be in a range of 20 to 200 kgf/cm², and more specifically in a range of 50 to 150 kgf/cm², but the present invention is not limited thereto. In addition, a temperature of the hot air may be in a range of 50 to 200° C., and more specifically in a range of 80 to 150° C., but the present invention is not limited thereto.

Also, in the method for treating contaminated soil according to one embodiment of the present invention, the insertion of the spraying rods and the spraying of the flushing liquid or the oxidizing liquid may be performed in the flushing step at the same time. That is, the spraying rods according to one embodiment of the present invention may include spraying ports at one end inserted into the soil. In this case, the spraying rods may be easily inserted while spraying the flushing liquid or the oxidizing liquid through the spraying ports and flushing or oxidizing the soil as well. In this case, the spraying rods have an advantage in that energy used to insert the spraying rods may be saved, and the flushing liquid or the oxidizing liquid may also be more uniformly sprayed on the soil to uniformly flush and oxidize the soil during the insertion of the spraying rods.

In addition, a desalinization procedure may be further performed by spraying a reducing microbial culture fluid on the soil on which the flushing step has been completely performed, thereby remediating the contaminated soil more efficiently.

In the method for treating contaminated soil according to one embodiment of the present invention, the flushing step may be directly performed by a method of inserting the spraying rods into the soil to perform a flushing step, or may be performed by transferring soil to a reactor and washing the soil transferred to the reactor, but the present invention is not limited thereto. In this case, when the spraying rods are directly inserted into the soil to perform the flushing step, the method may further include a cutoff wall installation step of installing a cutoff wall configured to prevent leakage of the flushing liquid or the oxidizing liquid before the flushing step is performed. The cutoff wall has an advantage in that the leakage of the flushing liquid or the oxidizing liquid may be prevented by such a cutoff wall, and the aforementioned collection step may be easily performed because the flushing liquid or the oxidizing liquid including the contaminants floats on the surface of soil. In this case, the cutoff wall is not limited as long as the cutoff wall is made from a material capable of blocking the leakage of the flushing liquid or the oxidizing liquid sprayed on the soil. Here, an insertion depth of such a cutoff wall may be identical to the final insertion depth of the spraying rods, or the cutoff wall may be inserted deeper by 10 to 50% than the insertion depth of the spraying rods, but the present invention is not limited thereto.

The method for treating contaminated soil according to the present invention includes a first collection step of collecting a floating material from the soil after the flushing step. In this case, the floating material may include a floating material (for example, scum, and the like) generated by the flushing liquid or the oxidizing liquid, partially separated soil, silty clay, and the like, but the present invention is not limited thereto. The contaminants in the soil may be separated by such a first collection step. Preferably, such a first collection step may be performed using an apparatus capable of collecting scum, and the like, as described above, and may be specifically performed using suction, and the like.

Specifically, such a first collection step may be performed in a storage tank disposed at one side of the soil to be treated. In particular, during the flushing step and/or after the flushing step is performed, floating materials floating on the soil may be transferred to the storage tank along the slope formed in the soil, and the like. In this case, the first collection step may be performed by a method of collecting the floating materials stored in this storage tank, but the present invention is not limited thereto.

The method for treating contaminated soil according to the present invention includes a first phase separation step of separating the floating material collected in the first collection step into a liquid phase and a solid phase. The liquid phase and the solid phase separated by such a phase separation step are subjected to separate treatments. By performing this treatment, the method has an advantage in that the contaminants in the soil may be treated without involving an additional treatment step such as transfer of the contaminants generated in the soil, as described above. Such a first phase separation step is not limited as long as the first phase separation step is performed by means of conventional equipment capable of separating a solid phase and a liquid phase, and the like. Specifically, a centrifugal separator, a shaking table sorter, a decanter, and the like may be used in the first phase separation step. In the floating material whose phases are separated in this way, the liquid phase may be filtered to remove the contaminants, and then discharged, or may be used in the aforementioned flushing liquid or oxidizing liquid, and the solid-phase material may be subjected to a heating step; a collection step; and a pyrolysis step, as will be described below, to decompose and remove the contaminants, and may then be transferred to the soil.

Accordingly, the method for treating contaminated soil according to the present invention includes a heating step of inserting a heating member into the solid-phase fraction separated in the phase separation step to heat the solid-phase fraction. The method has an advantage in that only the contaminants may be separated and removed and the soil included in the solid-phase fraction may be restored and recovered by separating the contaminants included in the solid-phase fraction by means of such heating, particularly by separating oils; pesticides; dioxins; volatile heavy metals such as mercury, arsenic, and the like; and contaminants such as organic compounds into a steam phase by means of steaming. Therefore, as described above, the method has an advantage in that the loss of soil by the flushing liquid or the oxidizing liquid may be prevented while using the flushing liquid or the oxidizing liquid to remove the contaminants in the soil with high efficiency.

Specifically, a temperature of the heating member in the heating step may be in a range of 400 to 800° C., and more specifically in a range of 450 to 650° C. Preferably, a temperature of the solid-phase fraction heated by such a heating member may be in a range of 400 to 800° C., and specifically in a range of 450 to 650° C. However, it is desirable that the temperature of the solid-phase fraction may vary depending on the contaminants included in the soil, and the like. In this case, the heating member is not limited as long as the heating member is a member capable of heating the soil in this temperature range. However, the heating member may be particularly a heating rod. In this case, the heating rod may generate heat using heat lines, and the like, but the present invention is not limited thereto. Also, such a heating step may be performed for 30 minutes to 30 days, and specifically for 30 minutes to 10 days, but the present invention is not limited thereto.

Also, the method for treating contaminated soil according to one embodiment of the present invention may include a heat transfer step of transferring heat emitted from the heating member by injecting the heat with high-pressure air simultaneously or sequentially with the aforementioned heating step. The method has an advantage in that the heat may be uniformly transferred to the solid-phase fraction in such a heat transfer step. Specifically, a pressure of the air injected in the heat transfer step may be in a range of 0.1 to 10 $kgf/cm^2$, and more specifically in a range of 0.5 to 7 $kgf/cm^2$, but the present invention is not limited thereto.

The method for treating contaminated soil according to the present invention includes a second collection step of collecting steam generated by heating in the heating step. The soil may be separated from the contaminants contained in the solid-phase fraction by this collection. This collection is not limited as long as the collection is performed using an apparatus or a method capable of collecting a gas-phase material. Specifically, the collection may be performed using a gas collector.

The method for treating contaminated soil according to the present invention includes a pyrolysis step of separating a gas phase from the floating material separated in the second collection step and subjecting the separated gas phase to heat treatment. The method has an advantage in that, when this pyrolysis step is used, additional cost and time are not required by performing decomposition of the contaminants in situ without requiring a separate step of separating the contaminants included in the soil and transferring the contaminants. Specifically, the pyrolysis temperature in the pyrolysis step may be in a range of 800 to 1,200° C., and specifically in a range of 1,000 to 1,200° C. In this case, it is desirable that the pyrolysis temperature may vary depending on the type of the contaminants included in the soil, and the like.

Also, the method for treating contaminated soil according to one embodiment of the present invention may further include a condensation step of condensing the floating material separated in the second collection step after the heating step and before the pyrolysis step. In this case, the condensation step may be performed by an apparatus or a method for cooling the second floating material separated in the heating step to ambient temperature. In this case, the ambient temperature may be in a range of 5 to 35° C., but the present invention is not limited thereto. The liquid phase may be separated from the second floating material by means of such a condensation step, and the separated liquid-phase fraction may be filtered to remove the contaminants, and then discharged out.

In addition, the solid-phase fraction, which has undergone the pyrolysis step, may be mixed again with the soil after the solid-phase fraction is subjected to the heating step, the collection step, and the like. Therefore, the method has an advantage in that the loss of soil may be minimized because the soil is reclaimed by these steps. In this case, the contamination in context of the contaminated soil may refer to contamination with oils; pesticides; dioxins; volatile heavy metals such as mercury, arsenic, and the like; and compounds such as organic compounds, and the like, but the present invention is not limited thereto. In this case, the dioxins may include both dioxins containing two oxygen atoms and furans containing one oxygen atom, but the present invention is not limited thereto.

Further, in the method for treating contaminated soil according to one embodiment of the present invention, a width of the soil to be treated at a time may vary depending on the number of spraying rods, the spraying pressure, a collection capacity of the collection portion, and the like. For example, soil having an area of 10 to 100 $m^2$ may be treated. That is, the method for treating contaminated soil according to one embodiment of the present invention may be used to remediate the soil with excessively high efficiency by treating a large area of the soil in situ at a time.

Also, the present invention provides an apparatus for treating contaminated soil.

In addition, the present invention provides an apparatus for treating contaminated soil using the aforementioned treatment method.

The apparatus for treating contaminated soil according to the present invention includes:

a flushing portion configured to inject a flushing liquid or an oxidizing liquid into soil to collect and flush or oxidize a floating material; and a reclamation portion configured to decompose contaminants in the solid-phase mixture separated in the flushing portion, wherein the flushing portion includes:

spraying rods inserted into the soil to be spaced apart from each other and including a spray nozzle configured to spray the flushing liquid or the oxidizing liquid; and a collection portion disposed on the soil into which the spraying rods are inserted and configured to collect the floating material.

When the contaminated soil is treated using the apparatus for treating contaminated soil according to the present invention, the apparatus has an advantage in that the contaminated soil may be treated in situ without movement of the soil, and the treating of slurry, and the like generated upon treatment of the contaminated soil may also be completed. Also, the apparatus has an advantage in that problems, such as the soil loss, which may be caused upon treating of the soil, may be solved by reclaiming the slurry generated by the flushing or oxidation to separate the soil. In addition, the apparatus for treating contaminated soil according to the present invention has an advantage in that the contaminants included in soil which is difficult to excavate, soil in a narrow space, or soil whose very deep bed is contaminated may be treated with high efficiency.

Specifically, in the apparatus for treating contaminated soil according to one embodiment of the present invention, the flushing portion may further include a high-pressure pump communicating with the spray nozzle and configured to spray the flushing liquid or the oxidizing liquid at a high pressure. A spraying pressure of the flushing liquid or the oxidizing liquid sprayed through such a high-pressure pump may be in a range of to 800 $kgf/cm^2$, but the present invention is not limited thereto. Also, the flushing liquid or the oxidizing liquid may be water, an oxidizing agent, or a surfactant. However, it is desirable that components of the flushing liquid or the oxidizing liquid may vary depending on the type and concentration of the contaminants included in the soil to be treated, and the like.

Also, in the apparatus for treating contaminated soil according to one embodiment of the present invention, the collection portion is not limited as long as the collection portion is a device capable of separating a floating flushing liquid or oxidizing liquid, scum, soil, and the like. For example, the collection portion may be a suction portion.

In the apparatus for treating contaminated soil according to one embodiment of the present invention, a length or a thickness of the spraying rods may vary depending on the depth of the soil to be treated, a spraying pressure, and the like. As one specific and non-limiting example, the length and thickness of the spraying rods may be in a range of 0.5 to 5 m and 10 to 50 cm, respectively, but the present invention is not limited thereto.

In the apparatus for treating contaminated soil according to one embodiment of the present invention, the reclamation portion includes:

a heating rod inserted into the solid-phase mixture separated in the collection portion to be spaced apart from each other;

a collection tube configured to collect steam generated by heat from the heating rod; and air injection tubes inserted into the solid-phase mixture to be spaced apart from each other and configured to inject air into the inside of the solid-phase mixture.

That is, the apparatus has an advantage in that the reclamation portion may separate the contaminants from the floating material generated in the flushing portion and treat the separated contaminants, and may reclaim some of the lost soil. Owing to this advantage, it is possible to prevent the loss of soil generated when a conventional ex-situ method is performed on a large area of the soil.

In this case, the heating rod is not limited as long as the heating rod is made of a material or a structure capable of being inserted into the solid-phase mixture to generate heat. Specifically, the heating rod may include a heat line formed therein, and such a heat line may electrically communicate with a power source. Specifically, the heating rod may have a length of 0.5 to 8 m and a thickness of 5 to 50 cm, but the present invention is not limited thereto. Also, a temperature of such a heating rod may be in a range of 400 to 800° C. When the temperature of the heating rod falls within this temperature range, the contaminants included in the soil may be easily separated without requiring excessive heating.

Also, the number of heating rods inserted into the solid-phase mixture may vary depending on an amount and width of the accumulated solid-phase mixture, and the like. Specifically, one heating rod may be inserted per 0.5 to 25 $m^2$ to heat the solid-phase mixture.

The reclamation portion according to one embodiment of the present invention includes a steam collection tube configured to collect steam. The steam collection tube may collect steam containing moisture, contaminants, and the like generated by heat from the heating rod. Also, it is desirable that a filter may be installed at an inlet port formed at the end of the collection tube or formed at the collection tube in order to prevent the inflow of the soil. Such a collection tube may communicate with a pressure reducer to collect steam under reduced pressure. That is, the apparatus for treating contaminated soil according to one embodiment of the present invention may further include a pressure reducer. In this case, the pressure reducer may communicate with the steam collection tube. A pressure reduced using such a pressure reducer is not limited as long as the reduced pressure falls within this pressure range in which the steam may be connected through the steam collection tube. Specifically, the reduced pressure may be in a range of 0 atmospheric pressure (atm) to 0.8 atm, and more specifically in a range of 0.1 to 0.7 atm.

In addition, the reclamation portion according to one embodiment of the present invention includes air injection tubes configured to inject air into the inside of the solid-phase mixture. Such air injection tubes may communicate with a compressor, as will be described below, and the compressor may inject compressed air into the solid-phase mixture through the air injection tubes. The high-pressure air thus injected transfers heat generated by the heating rod, and thus has an advantage in that the heat may be uniformly transferred to the solid-phase mixture. That is, the apparatus for treating contaminated soil according to one embodiment of the present invention may include a compressor, and the compressor may communicate with the air injection tubes. A pressure of the high-pressure air generated by such a compressor may vary depending on an amount and density of the solid-phase mixture, and the like. Specifically, the spraying pressure may be in a range of 20 to 200 kgf/cm$^2$, and specifically in a range of 50 to 150 kgf/cm$^2$.

Further, the reclamation portion according to one embodiment of the present invention may further include a cover layer configured to cover the solid-phase mixture. The leakage of the steam emitted from the solid-phase mixture may be prevented by such a cover layer. Also, the cover layer may include collection pores. The steam generated on the surface of the solid-phase mixture may be collected through the collection pores, and such collection pores may communicate with the aforementioned pressure reducer. In this case, a material for the cover layer is not limited as long as the material for the cover layer is a material capable of blocking the steam emitted from the solid-phase mixture. Specifically, the material for the cover layer may be a polymeric resin.

The reclamation portion according to one embodiment of the present invention may further include a gas-phase separator communicating with the collection pores and the steam collection tube. Such a gas-phase separator may be used to separate a gas phase and a solid/liquid mixture from the gas-phase floating material collected in the collection pores and the collection tube. Among the fractions thus separated in the gas-phase separator, the gas phase may communicate with a carbonization furnace, as will be described below, to carbonize the contaminants, and discharge the contaminants into the air, and the solid/liquid mixture may pass through an adsorption portion, and then may be discharged out.

That is, the reclamation portion according to one embodiment of the present invention further includes a carbonization furnace, and such a carbonization furnace may communicate with the gas-phase separator. During this carbonization, the contaminants in the gas phase may be carbonized to form relatively innocuous materials, which may be then discharged out. In this case, a temperature of the carbonization furnace is not limited as long as the temperature of the carbonization furnace falls within a temperature range capable of carbonizing the separated contaminants. Specifically, the temperature of the carbonization furnace may be in a range of 800 to 1,200° C.

Further, the reclamation portion according to one embodiment of the present invention further includes an adsorption portion, and such an adsorption portion may communicate with the gas-phase separator. The solid-phase material and the residual contaminants in the solid/liquid mixture separated in the gas-phase separator may be adsorbed by means of such an adsorption portion, and the solid/liquid mixture from which the contaminants are removed through the adsorption may be discharged out.

That is, the apparatus for treating contaminated soil according to one embodiment of the present invention has an advantage in that the loss of the soil may be prevented by treating the soil in the flushing portion, separating the contaminants in the solid-phase mixture including scum, and the like generated during a flushing procedure, reclaiming the soil, and returning the reclaimed soil into the original position.

The apparatus for treating contaminated soil according to one embodiment of the present invention may further include a cutoff wall. The apparatus has an advantage in that such a cutoff wall may prevent leakage of the flushing liquid or the oxidizing liquid out of the soil to be treated, and more efficiently collect the contaminants included in the soil, as well as preventing the leakage of the flushing liquid or the oxidizing liquid.

The apparatus for treating contaminated soil according to one embodiment of the present invention may further include a rail disposed on the soil and enabling installation of the spraying rods. That is, the apparatus for treating contaminated soil according to one embodiment of the present invention has an advantage in that a large area of the soil may be treated more efficiently by installing the spraying rods on the rail. Specifically, the spraying rods installed on the rail may be inserted into the soil while performing a treatment process. When the treatment process is completed, the spraying rods detached from the soil may move along the rail.

Hereinafter, the respective steps of the method for treating contaminated soil according to the present invention will be described in detail. However, it should be understood that the detailed steps as described below are provided for the purpose of illustrating the present invention, are not intended to limit the present invention.

EXAMPLE

Spraying rods were inserted to a depth of 1 m into soil contaminated with pesticides and oils. In this case, each of the spraying rods included 2,000 spraying ports, and such spraying rods were buried at an interval of 1 m. A first flushing liquid or oxidizing liquid was sprayed through each of the spraying rods at a rate of 8 m$^3$/min and a pressure of 60 kgf/cm$^2$ for 30 minutes. In this case, 10% by weight of hydrogen peroxide was used as the first flushing liquid or oxidizing liquid. Thereafter, as a second flushing liquid or oxidizing liquid, water was sprayed at a rate of 8 m$^3$/min and a pressure of 100 kgf/cm$^2$ for 30 minutes, and hot air at 100° C. was sprayed at a pressure of 7 kgf/cm$^2$ for 30 minutes. A floating material floating on the surface of the soil was collected during this spraying and up to an hour after the spraying. The collected floating material was centrifuged at 300 rpm for 20 minutes using a centrifugal separator to separate a liquid phase and a solid phase. The liquid phase was adsorbed using an adsorption filter, and then discharged out, and the solid phase is accommodated in a regeneration container to regenerate the solid phase. Each of a heating rod having a length of 50 cm, a collection tube configured to collect steam, and air injection tubes were buried in the solid phase-accommodated regeneration container. In this case, the heating rod, the collection tube, and the air injection tubes were buried so that the intervals between the heating rod and the heating rod, between the collection pores and the collection tube, and between the air injection tubes and the air injection tubes were 70 cm. In this case, each of the heating rods, the collection tube, and the air injection tubes communicated with a generator, a pressure reducer, and a compressor, respectively. The heating was performed at 650° C. for an hour using such heating rods. At the same time, the generated steam was collected through the collection tube while spraying air through the air injection tubes at a pressure of 0.5 to 7 kgf/cm$^2$. The collected steam was cooled to an ambient temperature using a condenser. In this case, the resulting liquid-phase fraction was adsorbed using an adsorption filter, and then discharged out, and the gas phase was carbonized in a carbonization furnace at 1,100° C. for two hours, and then discharged out.

It was confirmed that at least 95% of the pesticides and at least 97% of the oils included in the existing contaminated soil were removed through such a method, thereby removing the contaminants included in the soil with high efficiency.

The invention claimed is:

1. A method for treating contaminated soil, the method comprising:
   a cutoff wall installation step of installing a cutoff wall configured to prevent leakage of a flushing liquid comprising a zero-valent nanoiron or an oxidizing liquid comprising a zero-valent nanoiron;
   a flushing step of inserting spraying rods comprising a nozzle into soil to spray the flushing liquid or the oxidizing liquid thereto;
   a first collection step of collecting a floating material comprising liquid contaminants and solid contaminants from the soil and floating on the surface of the soil from the soil surface after the flushing step;
   a first phase separation step of separating the floating material collected in the first collection step into a liquid phase comprising the liquid contaminants and a solid phase comprising the solid contaminants;
   a heating step of inserting a heating member into the solid-phase fraction separated in the first phase separation step to heat the solid-phase fraction;
   a second collection step of collecting steam generated in the heating step; and
   a pyrolysis step of separating a gas phase from the collected steam by cooling the collected steam to an ambient temperature and subjecting the gas-phase fraction to heat treatment.

2. The method of claim 1, wherein a spraying pressure of the flushing liquid or the oxidizing liquid sprayed in the flushing step is in a range of 50 to 800 kgf/cm$^2$.

3. The method of claim 1, wherein a spraying capacity of the flushing liquid or the oxidizing liquid sprayed in the cleaning step is in a range of 1 to 25 m$^3$/min.

4. The method of claim 1, wherein a temperature of the heating member in the heating step is in a range of 400 to 800° C.

5. The method of claim 1, wherein a heat treatment temperature in the heat treatment step is in a range of 800 to 1,200° C.

6. The method of claim 1, wherein the zero-valent nanoiron has a particle size of 10 to 200 nm.

7. The method of claim 1, wherein a concentration of the zero-valent nanoiron is 0.1 to 20% by weight in the flushing liquid or the oxidizing liquid.

* * * * *